United States Patent
Mizui et al.

(10) Patent No.: US 6,881,694 B2
(45) Date of Patent: Apr. 19, 2005

(54) MICROWAVE DIELECTRIC PORCELAIN COMPOSITION AND DIELECTRIC RESONATOR

(75) Inventors: Toshihiro Mizui, Nagoya (JP); Kazuhisa Itakura, Nagoya (JP); Takuya Tarutani, Nagoya (JP)

(73) Assignee: NGK Spark Plug Co., Ltd., Aichi (JP)

( * ) Notice: Subject to any disclaimer, the term of this patent is extended or adjusted under 35 U.S.C. 154(b) by 0 days.

(21) Appl. No.: 10/416,764

(22) PCT Filed: Mar. 2, 2001

(86) PCT No.: PCT/JP01/01651

§ 371 (c)(1), (2), (4) Date: May 15, 2003

(87) PCT Pub. No.: WO02/41326

PCT Pub. Date: May 23, 2002

(65) Prior Publication Data

US 2004/0029710 A1 Feb. 12, 2004

(30) Foreign Application Priority Data

Nov. 20, 2000 (JP) ........................................ 2000-352996

(51) Int. Cl.$^7$ ............................................. C04B 35/465
(52) U.S. Cl. ....................................................... 501/136
(58) Field of Search ......................................... 501/136

(56) References Cited

U.S. PATENT DOCUMENTS

| 4,668,646 A | 5/1987 | Ando et al. |
| 5,356,844 A | 10/1994 | Hirahara et al. |
| 6,645,896 B1 * | 11/2003 | Okamoto et al. ........... 501/136 |
| 6,656,864 B1 * | 12/2003 | Okawa ........................ 501/136 |
| 6,756,335 B1 * | 6/2004 | Okawa ........................ 501/136 |
| 2002/0155942 A1 * | 10/2002 | Okawa ........................ 501/136 |

FOREIGN PATENT DOCUMENTS

| DE | 19945716 A1 * | 4/2001 |
| JP | 7-57537 | 3/1995 |
| JP | 9-118562 | 5/1997 |
| JP | 11-130544 | 5/1999 |
| JP | 0 987 230 A3 | 3/2000 |
| JP | 0 987 230 A2 | 3/2000 |

* cited by examiner

Primary Examiner—Karl Group
(74) Attorney, Agent, or Firm—Morgan Lewis & Bockius LLP

(57) ABSTRACT

The present invention relates to a microwave dielectric ceramic composition exhibiting excellent dielectric characteristics, including high Qu; and to a dielectric resonator which exhibits high Qu even when of large size. The present invention provides a microwave dielectric ceramic composition containing a primary component represented by $CaTiO_3$-$(1-x)REAlO_3$ [$0.54 \leq x \leq 0.82$] (wherein RE is composed only of an essential element La or composed of an essential element La and one or two optional elements selected from among Nd and Sm). The present invention also provides a microwave dielectric ceramic composition containing a primary component represented by the compositional formula: $xCaTiO_3$-$(1-x)LnAlO_3$ [$0.54 \leq x \leq 0.82$] (wherein Ln is at least one species selected from among Y, La, Nd, Sm, etc.); and Na in an amount as reduced to $Na_2O$ of 0.02 to 0.5 parts by mass on the basis of 100 parts by mass of the primary component. The present invention also provides a dielectric resonator produced from the aforementioned microwave dielectric ceramic composition.

9 Claims, 1 Drawing Sheet

MICROWAVE DIELECTRIC PORCELAIN COMPOSITION AND DIELECTRIC RESONATOR

TECHNICAL FIELD

The present invention relates to a novel microwave dielectric ceramic composition including a component having a specific crystal structure (hereinafter the composition will be referred to as a "dielectric ceramic composition"), and to a dielectric resonator formed of the ceramic composition. The dielectric ceramic composition of the present invention can be used in, for example, dielectric resonators and filters employed in microwave ranges, substrates for microwave integrated circuits, and impedance matching members for various microwave circuits.

BACKGROUND ART

Several publications, including Japanese Patent Application Laid-Open (kokai) No. 11-199320, disclose that when an oxide such as $Al_2O_3$ or $MnO_2$ is incorporated into a $CaTiO_3$-based composition having a perovskite-type crystal structure and serving as the primary component of a dielectric ceramic composition, there can be obtained a dielectric ceramic composition which exhibits, in microwave ranges, practically sufficient relative dielectric constant (hereinafter referred to as "$\in_r$") and unloaded quality factor (hereinafter referred to as "Qu"), and small absolute value of the temperature coefficient of resonance frequency (hereinafter the temperature coefficient will be referred to as "$\tau_f$"). The dielectric ceramic composition exhibits excellent dielectric characteristics; specifically a Qu of 3,500 to 4,200 and a $\tau_f$ of 0 to +8.0 ppm/° C.

However, in recent years, the frequency range within which dielectric ceramic compositions are employed has been expanded from microwave ranges to sub-millimeter wave ranges, and thus a dielectric ceramic composition exhibiting higher Qu has been demanded. Particularly when a dielectric ceramic composition is employed for forming a large-sized dielectric resonator, if the entirety of the ceramic composition is not sufficiently sintered and thus uniformity is not attained, the resultant dielectric resonator involves problems such as lowering of Qu. Therefore, demand has arisen for a dielectric ceramic composition which exhibits $\in_r$ and Qu higher than those of a conventional dielectric ceramic composition and small absolute value of $\tau_f$, and which, when sintered sufficiently at its interior and exterior regions, enables production of a large-sized dielectric resonator that consistently exhibits high Qu. Also, demand has arisen for a dielectric resonator produced from such a dielectric ceramic composition.

In view of the foregoing, an object of the present invention is to provide a dielectric ceramic composition which exhibit practically sufficient $\in_r$ and Qu and which attains smaller absolute value of $\tau_f$. Another object of the present invention is to provide a dielectric resonator product produced from the dielectric ceramic composition exhibiting excellent dielectric characteristics, which exhibits high Qu even when of large size.

DISCLOSURE OF THE INVENTION

A characteristic feature of the dielectric ceramic composition of the present invention resides in that the composition comprises a primary component represented by the compositional formula: $xCaTiO_3\text{-}(1-x)REAlO_3$ [$0.54 \leq x \leq 0.82$] (wherein RE is composed only of an essential element La or composed of an essential element La and one or two optional elements selected from among Nd and Sm).

When the value "x" is less than 0.54, $\tau_f$ assumes an excessively large negative value, and $\in_r$ decreases, whereas when x exceeds 0.82, $\tau_f$ assumes an excessively large positive value. The value x is more preferably 0.6 to 0.8, much more preferably 0.65 to 0.7. When x falls within the above range, the composition exhibits an $\in_r$ of at least 39 (preferably at least 42, more preferably at least 44, much more preferably at least 50), a Qu of at least 3,850 (preferably at least 3,900, more preferably at least 4,000, much more preferably at least 4,250, and a $\tau_f$ of −30 to +45 ppm/° C. (preferably −30 to +30 ppm/° C., more preferably −10 to +10 ppm/° C.).

When proportions by mol of La, Nd, and Sm incorporated as RE; i.e., La:Nd:Sm, are represented by $\alpha:\beta:\gamma$, preferably, $\alpha$, $\beta$, and $\gamma$ satisfy the following relations: $0.4 \leq \alpha \leq 1.0$, $0 \leq \beta \leq 0.2$, $0 \leq \gamma \leq 0.5$, and $\alpha+\beta+\gamma=1.0$. When $\alpha$ falls outside the above range, $\in_r$ tends to be lowered. When $\beta$ falls outside the above range, Qu tends to drop. When $\gamma$ falls outside the above range, $\in_r$ tends to decrease, and $\tau_f$ tends to assume a large negative value. All these cases are not preferred.

When $\alpha$, $\beta$, and $\gamma$ fall within the above ranges, the dielectric ceramic composition exhibits excellent dielectric characteristics; specifically an $\in_r$ of at least 43 (preferably at least 44, more preferably at least 44.5), a Qu of at least 3,900 (preferably at least 4,000, more preferably at least 4,100), and a $\tau_f$ of −1.3 to −5.5 ppm/° C. (preferably −1.3 to −4.5 ppm/° C.).

The dielectric ceramic composition of the present invention preferably contains Ta. The incorporation amount of Ta as reduced to $Ta_2O_5$ is preferably 0.3 to 5 parts by mass (hereinafter may be referred to simply as "part(s)") on the basis of 100 parts of the aforementioned primary component. When the incorporation amount of Ta is less than 0.3 parts, the dielectric ceramic composition and a resonator produced from the composition fail to exhibit sufficiently increased Qu. In contrast, when the incorporation amount of Ta exceeds 5 parts, $\in_r$ increases, but Qu decreases. Ta may be incorporated into the composition in the form of $Ta_2O_5$. When Ta is incorporated in the form of $Ta_2O_5$, $\tau_f$ can be maintained at a small value in the vicinity of 0. When $Ta_2O_5$ is incorporated into the composition, the incorporation amount of $Ta_2O_5$ is preferably 0.5 to 4 parts, more preferably 1 to 3.5 parts. By virtue of incorporation of $Ta_2O_5$, the dielectric ceramic composition exhibits excellent dielectric characteristics; specifically an $\in_r$ of at least 40 (preferably at least 43, more preferably at least 44, much more preferably at least 48), a Qu of at least 3,800 (preferably at least 3,900, more preferably at least 4,000), and a $\tau_f$ of −9 to +9 ppm/° C. (preferably −8 to +8 ppm/° C., more preferably −7 to +7 ppm/° C.).

The dielectric ceramic composition of the present invention may further contain $MnO_2$ in an amount of 0.5 parts or less on the basis of 100 parts of the total amount of the aforementioned primary component and $Ta_2O_5$. When the incorporation amount of $MnO_2$ exceeds 0.5 parts, $\in_r$ increases, but Qu is lowered, and the absolute value of $\tau_f$ tends to become large. The incorporation amount of $MnO_2$ is preferably 0.01 to 0.45 parts, more preferably 0.1 to 0.4 parts.

The dielectric ceramic composition of the present invention exhibits a Qu of at least 30,000 at a resonance frequency of 800 MHz. Therefore, the composition can be employed in low frequency ranges. When the dielectric ceramic composition is employed in low frequency ranges, the composition exhibits particularly high Qu, and in addition, the composition exhibits a $\tau_f$ of −10 to +10 ppm/° C.; i.e., $\tau_f$ is maintained within a very small range around 0 ppm/° C.

The primary component of the dielectric ceramic composition of the present invention; i.e., $xCaTiO_3$-$(1-x)REAlO_3$, can be produced through the following process: powdery raw materials; specifically oxides of Ca, Ln, Al, and Ti, hydroxides of the respective elements, or compounds of the respective elements (e.g., carbonates such as $CaCO_3$) which can be converted into oxides thereof through heating, are mixed together; and the resultant mixture is fired. Similar to the case of the above elemental components, if desired, a Ta or Mn component can be incorporated into the composition through the following process: a powdery raw material; specifically an oxide of Ta or Mn, or a compound of Ta or Mn (e.g., a carbonate) which can be converted into an oxide thereof through heating, is mixed with the composition; and the resultant mixture is fired. In general, the dielectric ceramic composition of the present invention exhibiting the aforementioned excellent characteristics can be produced by mixing together a Ca-containing oxide and/or a Ca-containing compound which can be converted into an oxide of Ca through heating, a Ti-containing oxide and/or a Ti-containing compound which can be converted into an oxide of Ti through heating, an RE-element-containing oxide and/or an RE-element-containing compound which can be converted into an oxide of RE through heating (wherein RE is composed only of an essential element La or composed of an essential element La and one or two optional elements selected from among Nd and Sm) and an Al-containing oxide and/or an Al-containing compound which can be converted into an oxide of Al through heating, the oxides and/or the compounds serving as raw materials, such that proportions by mol of Ca, Ti, the RE element, and Al are x:x:(1-x):(1-x) [ $0.54 \leq x \leq 0.82$ ], to thereby prepare a raw material mixture; and then by firing the raw material mixture.

A characteristic feature of the dielectric ceramic composition of the present invention resides in that the composition comprises a primary component represented by the compositional formula: $xCa_aTi_bO_3$-$(1-x)Ln_cAl_dO_3$ [$0.54 \leq x \leq 0.82$] (wherein Ln is at least one species selected from among Y, La, Ce, Pr, Nd, Sm, Eu, Gd, Dy, Er, and Yb; and each of a/b and c/d is 0.8 to 1.2); and Na in an amount as reduced to $Na_2O$ of 0.02 to 0.5 parts by mass on the basis of 100 parts by mass of the primary component.

In the dielectric ceramic composition of the present invention, each of "a/b" (i.e., the ratio of Ca to Ti) and "c/d" (i.e., the ratio of Ln to Al) is typically 0.8 to 1.2, preferably 0.85 to 1.2, more preferably 0.90 to 1.2, much more preferably 1.0. When each of "a/b" and "c/d" is 1.0, the aforementioned primary component is represented by the following compositional formula: $xCaTiO_3$-$(1-x)LnAlO_3$ [$0.54 \leq x \leq 0.82$]. When each of "a/b" and "c/d" is less than 0.8 or exceeds 1.2, sintering proceeds insufficiently, and Qu of a dielectric resonator produced from the composition is considerably lowered.

In the dielectric ceramic composition of the present invention, when the value "x" is less than 0.54, $\in_r$ decreases, and $\tau_f$ assumes a large negative value. In contrast, when x exceeds 0.82, Qu of a dielectric resonator produced from the composition is considerably lowered, and $\tau_f$ assumes a very large positive value. When x is 0.65 to 0.70, the dielectric ceramic composition exhibits an $\in_r$ of at least 39, preferably at least 44, and a Qu of at least 3,600, preferably at least 4,000. When a dielectric resonator is produced from the dielectric ceramic composition, the dielectric resonator exhibits a Qu of at least 30,000, preferably at least 33,000.

When the incorporation amount of Na as reduced to $Na_2O$ is less than 0.02 parts on the basis of 100 parts of the aforementioned primary component, Qu of the dielectric ceramic composition fails to be increased sufficiently, and particularly, Qu of a dielectric resonator produced from the composition is considerably lowered. In contrast, when the incorporation amount of Na as reduced to $Na_2O$ exceeds 0.5 parts on the basis of 100 parts of the primary component, Qu of the dielectric ceramic composition tends to be lowered. The incorporation amount of Na is preferably 0.05 to 0.15 parts. When the amount of Na falls within the preferred range, the dielectric ceramic composition and dielectric resonator consistently exhibit high Qu. Na effectively acts as a sintering aid. Therefore, when Na is incorporated into the dielectric ceramic composition, the interior and exterior of a molded product of the composition can be uniformly fired, and the resultant sintered product exhibits homogeneity. When a large-sized resonator is produced from the sintered product, the resonator exhibits high Qu.

The dielectric ceramic composition of the present invention preferably contains Ta. The incorporation amount of Ta as reduced to $Ta_2O_5$ is preferably 0.3 to 5 parts on the basis of 100 parts of the primary component. When the incorporation amount of Ta is less than 0.3 parts, the dielectric ceramic composition and a resonator produced from the composition fail to exhibit sufficiently increased Qu. In contrast, when the incorporation amount of Ta exceeds 5 parts, Qu of the dielectric ceramic composition and resonator tends to be lowered. The incorporation amount of Ta is particularly preferably 0.5 to 2 parts. When the amount of Ta falls within the particularly preferred range, Qu is sufficiently increased. Ta may be incorporated into the ceramic composition in the form of $Ta_2O_5$.

The aforementioned "Ln" contained in the dielectric ceramic composition of the present invention may be any of the aforementioned elements, but preferably, La accounts for at least a portion of Ln. La may account for the entirety of Ln. When La is incorporated into the dielectric ceramic composition, the composition exhibits excellent dielectric characteristics; specifically an $\in_r$ of at least 43 and a $\tau_f$ of −10 to +10 ppm/° C. (preferably −5 to +5 ppm/° C.). When a dielectric resonator is produced from the dielectric ceramic composition containing La, the resonator exhibits a Qu of at least 30,000. Particularly when a dielectric resonator is produced from the dielectric ceramic composition containing La and Ta, the resonator may exhibit higher Qu.

Even when Ln is composed of La, and optionally Nd or Sm, or alternatively composed of La, Nd, and Sm, similar to the case where the entirety of Ln is La, the dielectric ceramic composition exhibits excellent dielectric characteristics. Specifically, when Ln is composed of La, and optionally Nd or Sm, the ratio by mol of La/(Nd or Sm) is preferably 0.3/0.7 to 0.7/0.3, more preferably 0.4/0.6 to 0.6/0.4 (La+Nd or Sm=1), whereas when Ln is composed of La, Nd, and Sm, proportions by mol of La, Nd, and Sm are preferably regulated so as to satisfy the following relations: $0.4 \leq La < 1$, $0 < Nd \leq 0.2$, and $0 < Sm \leq 0.5$ (La+Nd+Sm=1). When the amount of La falls outside the above range, $\in_r$ tends to be lowered, whereas when the amount of Nd or Sm falls outside the above range, $\in_r$ decreases and $\tau_f$ tends to assume a large negative value; whichever the case, the results are not preferred.

The dielectric ceramic composition of the present invention may further contain Mn. The incorporation amount of Mn as reduced to $MnO_2$ is preferably 0.5 parts or less, more preferably 0.02 to 0.5 parts, on the basis of 100 parts of the primary component. When the incorporation amount of Mn is less than 0.02 parts, Qu fails to be increased, whereas when the incorporation amount of Mn exceeds 0.5 parts, Qu tends to be lowered. Mn may be incorporated into the dielectric ceramic composition in the form of $MnO_2$.

When the primary component represented by $xCa_aTi_bO_3$-(1-x x)$Ln_cAl_dO_3$ or $xCaTiO_3$-(1-x)$LnAlO_3$, and specific amounts of Ta and Mn components are incorporated into the dielectric ceramic composition, the composition exhibits excellent dielectric characteristics. However, when a large-sized dielectric resonator is produced from the composition, in some cases, the interior portion of a molded product of the composition is not sintered as sufficiently as is the exterior portion thereof, and dielectric characteristics of the resonator, such as Qu, are impaired. When an Na component is further incorporated into the composition together with the primary component, since Na effectively acts as a sintering aid, the interior and exterior of the composition are sufficiently sintered, and the resultant sintered product exhibits homogeneity. Therefore, when a large-sized resonator is produced from the sintered product, the resonator exhibits high Qu.

When an Na component or both an Na component and a Ta component are incorporated into the dielectric ceramic composition together with the primary component, the composition exhibits an $\in_r$ of at least 39, preferably at least 40. When an Mn component is further incorporated into the dielectric ceramic composition, the composition exhibits an $\in_r$ of at least 43, and depending on the compositional proportions of these components, the composition exhibits an $\in_r$ of at least 45. Meanwhile, when an Na component or both an Na component and a Ta component, and an Mn component are incorporated into the dielectric ceramic composition together with the primary component, the composition exhibits a Qu of at least 3,600, and depending on the compositional proportions of these components, the composition exhibits a Qu of at least 4,000; i.e., the composition exhibits practically sufficient dielectric characteristics. Similar to the above cases, when an Na component or both an Na component and a Ta component, and an Mn component are incorporated into the dielectric ceramic composition together with the primary component, the composition exhibits a $\tau_f$ of −35 to +35 ppm/° C., and depending on the compositional proportions of these components, the composition exhibits a $\tau_f$ of −10 to +10 ppm/° C. (preferably −5 to +5 ppm/° C.); i.e., the composition exhibits excellent dielectric characteristics.

The dielectric ceramic composition of the present invention exhibits a Qu of at least 30,000, preferably at least 32,000, at a resonance frequency of 800 MHz. Therefore, the composition can be employed in low frequency ranges. When the dielectric ceramic composition is employed in low frequency ranges, the composition exhibits particularly high Qu, and in addition, the composition exhibits a $\tau_f$ of −10 to +10 ppm/° C., preferably −6 to +6 ppm/° C.; i.e., $\tau_f$ is maintained within a very small range around 0 ppm/° C.

The primary component of the dielectric ceramic composition of the present invention; i.e., $xCa_aTi_bO_3$-(1-x) $Ln_cAl_dO_3$ or $xCaTiO_3$-(1-x)$LnAlO_3$, can be produced through the following process: powdery raw materials; specifically oxides of Ca, Ln, Al, and Ti, hydroxides of the respective elements, or compounds of the respective elements (e.g., carbonates such as $CaCO_3$ and $Na_2CO_3$) which can be converted into oxides thereof through heating, are mixed together; and the resultant mixture is fired. Similar to the case of the above elemental components, if desired, a Ta or Mn component can be incorporated into the composition through the following process: a powdery raw material; specifically an oxide of Ta or Mn, or a compound of Ta or Mn (e.g., a carbonate) which can be converted into an oxide thereof, is mixed with the composition; and the resultant mixture is fired. In general, the dielectric ceramic composition of the present invention exhibiting the aforementioned excellent characteristics can be produced by mixing together a Ca-containing oxide and/or a Ca-containing compound which can be converted into an oxide of Ca through heating, a Ti-containing oxide and/or a Ti-containing compound which can be converted into an oxide of Ti through heating, an Ln-element-containing oxide and/or an Ln-element-containing compound which can be converted into an oxide of Ln through heating (Ln: at least one species selected from among Y, La, Ce, Pr, Nd, Sm, Eu, Gd, Dy, Er, and Yb), an Al-containing oxide and/or an Al-containing compound which can be converted into an oxide of Al through heating, and an Na-containing oxide and/or an Na-containing compound which can be converted into an oxide of Na through heating, the oxides and/or the compounds serving as raw materials, such that proportions by mol of Ca, Ti, the Ln element, and Al are x:x:(1-x):(1-x) [$0.54 \leq x \leq 0.82$], and that the amount as reduced to $Na_2O$ of the Na-containing oxide and/or the Na-containing compound which can be converted into an oxide of Na through heating is 0.02 to 0.5 parts by mass on the basis of 100 parts by mass of the total amount of the Ca-containing oxide and/or the Ca-containing compound which can be converted into an oxide of Ca through heating, the Ti-containing oxide and/or the Ti-containing compound which can be converted into an oxide of Ti through heating, the Ln-element-containing oxide and/or the Ln-element-containing compound which can be converted into an oxide of Ln through heating, and the Al-containing oxide and/or the Al-containing compound which can be converted into an oxide of Al through heating, to thereby prepare a raw material mixture; and then by firing the raw material mixture.

A characteristic feature of the dielectric resonator of the present invention resides in that the resonator is produced from the dielectric ceramic composition of the present invention. The dielectric resonator exhibits high Qu consistently even when large in size. Specifically, the dielectric resonator exhibits an unloaded quality factor of at least 30,000, preferably at least 32,000, at a resonance frequency of 800 MHz.

BEST MODE FOR CARRYING OUT THE INVENTION

Figure 1:
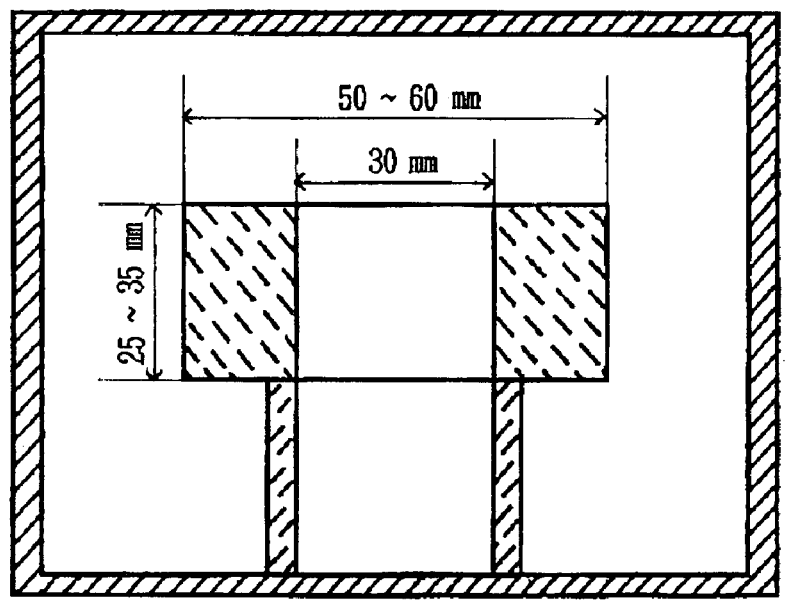
FIG. 1 is a cross-sectional view showing the shape and dimensions of a dielectric resonator disposed in a metallic casing.

Specific embodiments of the present invention will next be described.

<1>First Embodiment (1) Preparation of Test Piece $TiO_2$ powder (purity: 99.95%), $CaCO_3$ powder (purity: 99.9%), $La_2O_3$ powder (purity: 99.9%), $Nd_2O_3$ powder (purity: 99.9%), $Sm_2O_3$ powder (purity: 99.9%), $Al_2O_3$ powder (purity: 99.95%), and $Ta_2O_5$ powder (purity: 99.2%) were weighed so as to satisfy compositional proportions shown in Table 1, and then dry-mixed by use of a mixer for 20 to 30 minutes. The resultant mixture was subjected to primary crushing, and subsequently the mixture was calcined in air at 1,100 to 1,300° C. for two hours. Thereafter, appropriate amounts of an organic binder and water were added to the calcined powder, and the resultant mixture was subjected to crushing by use of zirconia balls (diameter: 10 mm) at 90 rpm for 10 to 15 hours. Subsequently, the thus-crushed powder was frozen and dried under vacuum (vacuum: about 0.4 Torr, freezing temperature: −20 to −40° C., drying temperature: 40 to 50° C., drying time: about 20 hours), to thereby perform granulation. The thus-granulated powder was molded under application of a pressure of 1 ton/cm² into a cylindrical product (diameter: 19 mm, height: 11 mm).

Subsequently, the molded product was subjected to degreasing in air at 500° C. for four hours, followed by firing at 1,400 to 1,700° C. for four hours. The end surfaces of the resultant sintered product were polished, to thereby prepare a cylindrical test piece (diameter: 16 mm, height: 8 mm) (Nos. 1 through 26).

In the calcination process, the temperature increasing rate and temperature decreasing rate were regulated to 200° C./h and −200° C./h, respectively. In the degreasing process, the temperature increasing rate was regulated to 50° C./h. In the firing process, the temperature increasing rate and temperature decreasing rate were regulated to 100° C./h and −100° C./h, respectively.

(2) Evaluation of Dielectric Characteristics

The thus-prepared test piece was subjected to measurement of Qu, $\in_r$, and $\tau_f$ (temperature range: 25 to 80° C.) at a resonance frequency of 3.0 to 5.0 GHz by means of the parallel-conductive-plate-type dielectric rod resonator method (TE$_{011}$ mode). In this case, $\tau_f$ was calculated by use of the following formula: $\tau_f=(f_{80}-f_{25})/(f_{25}\times\Delta T)(\Delta T=80°$ C.−25° C.=55° C.). The results are shown in Table 1. In Table 1, values marked with * fall outside the scope of the present invention.

(3) Effects Confirmed in the First Embodiment

As is clear from the results shown in Table 1, when a dielectric ceramic composition is formed of a CaTiO$_3$-REAlO$_3$-based sintered product, the composition exhibits an $\in_r$ of 39 to 51, a Qu of 3,800 to 4,240, and a $\tau_f$ of −30 to +40 ppm/° C. The results also show that test piece No. 1, in which x is below the lower limit, exhibits a $\tau_f$ of −39.1 ppm/° C. (a large negative value) and an $\in_r$ as low as 38.8. The results also show that test piece No. 11, in which x exceeds the upper limit, exhibits a $\tau_f$ of +54.2 ppm/° C. (a large positive value) and a Qu as low as 3,804.

The results of test pieces Nos. 12 through 15, 17, and 18 show that when the amounts of Nd and Sm incorporated as RE are varied, $\in_r$ is regulated within a range of 43 to 45, Qu is regulated within a range of 3,800 to 4,100, and $\tau_f$ is regulated to a small negative value. The results of test pieces Nos. 19 through 22 and 24 through 26 show that when Ta$_2$O$_5$ or both Ta$_2$O$_5$ and MnO$_2$ are incorporated, $\in_r$ is increased, Qu is regulated within a range of 3,800 to 4,100, and $\tau_f$ is regulated to a small positive value. The results also show that, in test piece No. 16 in which β exceeds the upper limit, $\in_r$ is large, and $\tau_f$ is a small negative value, but Qu is lowered to 3,800 or less. The results also show that, in test piece No. 23 in which the amount of Ta$_2$O$_5$ exceeds the upper limit, and in test piece No. 27 in which the amount of MnO$_2$ exceeds the upper limit, $\in_r$ is large, but Qu is lowered to 3,700 or less.

<2>Second Embodiment (1) Production of Test Piece and Dielectric Resonator

CaCO$_3$ powder (purity: 99.9%), TiO$_2$ powder (purity: 99.95%), Al$_2$O$_3$ powder (purity: 99.95%), powder of an oxide of Ln shown in Table 2 or 3 (purity: 99.9%), Na$_2$CO$_3$ powder (purity: 99.5%), Ta$_2$O$_5$ powder (purity: 99.95%), and MnO$_2$ powder (purity: 99.9%), serving as powdery raw materials, were weighed so as to satisfy conditions shown in Table 2 or 3 (x, mol ratio of Ln, and amounts of Na$_2$O, Ta$_2$O$_5$, and MnO$_2$), and then dry-mixed by use of a mixer for 20 to 30 minutes. Subsequently, the resultant mixture was subjected to primary crushing by use of a vibration mill.

TABLE 1

| No. | x | α | β | γ | Ta$_2$O$_5$ | MnO$_2$ | $\in_r$ | Qu | $\tau_f$ (ppm/° C.) |
|---|---|---|---|---|---|---|---|---|---|
| 1 | *0.52 | 1.0 | — | — | | | 38.8 | 4245 | −39.1 |
| 2 | 0.55 | | | | | | 40.3 | 4208 | −29.8 |
| 3 | 0.59 | | | | | | 41.7 | 4148 | −11.8 |
| 4 | 0.61 | | | | | | 42.8 | 4129 | −1.0 |
| 5 | 0.65 | | | | | | 44.1 | 4070 | −0.5 |
| 6 | 0.68 | | | | | | 44.9 | 4041 | +4.3 |
| 7 | 0.70 | | | | | | 46.2 | 4006 | +13.8 |
| 8 | 0.73 | | | | | | 47.0 | 3960 | +20.8 |
| 9 | 0.77 | | | | | | 48.8 | 3914 | +31.8 |
| 10 | 0.80 | | | | | | 50.1 | 3890 | +42.8 |
| 11 | *0.84 | | | | | | 51.5 | 3804 | +54.2 |
| 12 | 0.67 | 0.5 | | 0.50 | | | 43.9 | 4066 | −3.65 |
| 13 | | | 0.02 | 0.48 | | | 44.0 | 4006 | −5.16 |
| 14 | | | 0.05 | 0.45 | | | 43.8 | 4098 | −4.53 |
| 15 | | | 0.1 | 0.40 | | | 44.1 | 3919 | −4.47 |
| 16 | | | 0.5 | — | | | 44.5 | 3796 | −3.41 |
| 17 | | 0.6 | 0.04 | 0.36 | | | 44.0 | 4012 | −2.74 |
| 18 | | 0.7 | 0.03 | 0.27 | | | 44.3 | 3973 | −1.35 |
| 19 | 0.68 | 1.0 | — | — | 0.5 | | 44.2 | 4012 | +2.1 |
| 20 | | | | | 1.0 | | 44.9 | 4041 | +4.3 |
| 21 | | | | | 2.0 | | 45.6 | 3980 | +5.4 |
| 22 | | | | | 3.0 | | 46.5 | 3875 | +6.8 |
| 23 | | | | | 6.0 | | 48.2 | 3653 | +9.8 |
| 24 | | | | | 1.0 | 0.1 | 44.8 | 4038 | +4.1 |
| 25 | | | | | | 0.2 | 45.0 | 3980 | +5.2 |
| 26 | | | | | | 0.4 | 45.5 | 3905 | +6.4 |
| 27 | | | | | | 0.8 | 46.1 | 3793 | +10.1 |

Alumina balls were employed as grinding balls, and the crushing was performed for four hours.

The thus-crushed powder was calcined in air at 1,100 to 1,300° C. for two hours; appropriate amounts of an organic binder and water were added to the thus-calcined powder; and the resultant mixture was subjected to secondary crushing by use of a trommel crushing apparatus for 10 to 15 hours. Subsequently, the thus-crushed powder was freeze-dried and granulated, and then the resultant powder was subjected to sieving, to thereby yield powder having a particle size of 40 to 200 mesh. The thus-obtained powder was molded by use of a press into a product for a test piece (diameter: 19 mm, height: 11 mm). Separately, the thus-obtained powder was molded by use of a press into a product for a resonator (outer diameter: 75 mm, inner diameter: 37 mm, height: 45 mm). The molding pressure was regulated to 1 ton/cm$^2$.

Thereafter, these molded products were subjected to degreasing at 500° C. for four hours, and then fired in air at 1,400 to 1,700° C. for two to six hours. Subsequently, the circumferences and end surfaces of the resultant sintered products were polished, to thereby produce a cylindrical test piece (diameter: 16 mm, height: 8 mm) and a cylindrical dielectric resonator shown in FIG. 1 (Test Examples 1 through 35). The dimensions of the dielectric resonator were regulated within ranges shown in FIG. 1 so as to attain a resonance frequency of 800 MHz.

(2) Composition Analysis of Sintered Product

Sintered products were produced from powdery raw materials (compositional proportions thereof are shown in Table 4) in a manner similar to that described above in (1), and the circumferences and end surfaces of the sintered products were polished by use of an abrasive stone (#800), to thereby produce a cylindrical test piece (diameter: 16 mm, height: 8 mm), and a cylindrical dielectric resonator shown in FIG. 1 (Test Examples 36 through 44). Each of the test pieces of Test Examples 36 through 44 was subjected to fluorescent X-ray analysis by use of "RIX 2000" (product of Rigaku Corporation) employing an Rh tubular bulb (X-ray source) under the following conditions: X-ray output: 50 kV, 50 mA, irradiation area: $\phi$10 mm. Proportions by mass (mass %) of the elements obtained through this analysis were converted into proportions by mol of oxides of the elements, and the ratio "a/b" and the ratio "c/d" in the compositional formula: $xCa_aTi_bO_3$-$(1-x)Ln_cAl_dO_3$ were calculated. The results are shown in Table 4.

TABLE 2

| Test Ex. No. | x | Ln | Na$_2$O | Ta$_2$O$_5$ | MnO$_2$ | $\epsilon_r$ | Qu | $\tau_f$ | Resonator Qu |
|---|---|---|---|---|---|---|---|---|---|
| 1 | 0.67 | Y/1.0 | 0.1 | — | — | 41.2 | 3670 | +5.8 | 30000 |
| 2* | | — | | | | 41.3 | 3610 | +5.9 | 24000 |
| 3 | 0.67 | Sm/1.0 | 0.1 | — | — | 41.0 | 4010 | −8.2 | 30000 |
| 4 | | Nd/1.0 | | | | 43.2 | 4020 | −5.8 | 32000 |
| 5 | | Yb/1.0 | | | | 39.4 | 3630 | +9.8 | 30000 |
| 6* | 0.67 | Yb/1.0 | — | | | 39.2 | 3620 | +10.2 | 22000 |
| 7* | 0.52 | La/1.0 | 0.1 | 1.0 | — | 36.6 | 4260 | −39.9 | 37200 |
| 8 | 0.55 | La/1.0 | 0.1 | 1.0 | — | 40.1 | 4238 | −29.8 | 36900 |
| 9 | 0.59 | | | | | 41.6 | 4189 | −12.6 | 36000 |
| 10 | | | — | | | 41.7 | 4148 | −11.8 | 33100 |
| 11 | 0.61 | La/1.0 | 0.1 | 1.0 | — | 42.6 | 4150 | −1.3 | 35400 |
| 12 | 0.65 | | | | | 43.9 | 4130 | −0.8 | 35100 |
| 13 | | | — | | | 44.1 | 4070 | −0.5 | 30000 |
| 14 | 0.68 | La/1.0 | 0.1 | 1.0 | — | 44.7 | 4041 | +4.1 | 33100 |
| 15 | 0.70 | | | 1.5 | | 46.0 | 4060 | +13.5 | 32000 |
| 16 | | | — | | | 46.2 | 4006 | +13.8 | 27700 |

TABLE 3

| Test Ex. No. | x | Ln | Na$_2$O | Ta$_2$O$_5$ | MnO$_2$ | $\epsilon_r$ | Qu | $\tau_f$ | Resonator Qu |
|---|---|---|---|---|---|---|---|---|---|
| 17 | 0.73 | La/1.0 | 0.1 | 1.0 | 0.1 | 46.8 | 3980 | +20.4 | 30100 |
| 18 | 0.77 | | | | | 48.6 | 3930 | +31.5 | 30100 |
| 19* | 0.83 | | | | | 49.9 | 3910 | +40.0 | 22400 |
| 20* | 0.84 | | | | | 51.3 | 3828 | +51.4 | 16400 |
| 21 | 0.67 | La/0.5 + Sm/0.5 | 0.1 | 1.5 | 0.1 | 43.7 | 4080 | −3.8 | 35754 |
| 22 | | La/0.5 + Nd/0.02 + Sm/0.48 | 0.05 | | | 44.0 | 4020 | −5.3 | 35900 |
| 23 | | La/0.5 + Nd/0.05 + Sm/0.45 | 0.1 | | | 43.6 | 4120 | −4.6 | 36600 |
| 24 | | | 0.15 | | | 43.8 | 4098 | −4.5 | 34000 |
| 25 | | La/0.5 + Nd/0.1 + Sm/0.4 | 0.25 | | | 43.9 | 3940 | −4.8 | 32800 |
| 26 | | | 0.7 | | | 40.2 | 3500 | −5.4 | 24200 |
| 27 | 0.67 | La/0.5 + Nd/0.5 | 0.15 | 1.0 | 0.3 | 44.3 | 4000 | −3.8 | 33500 |
| 28 | | La/0.6 + Nd/0.04 + Sm/0.36 | 0.1 | | 0.2 | 43.8 | 4022 | −3.2 | 33400 |
| 29 | | La/0.7 + Nd/0.03 + Sm/0.27 | | | | 44.1 | 4002 | −1.5 | 34100 |
| 30 | 0.68 | La/1.0 | 0.1 | 0.5 | 0.1 | 44.0 | 4098 | +1.8 | 34000 |
| 31 | | | | 2.0 | | 45.4 | 4005 | +5.1 | 34800 |
| 32 | | | | 3.0 | | 46.3 | 3920 | +6.2 | 31100 |
| 33 | 0.68 | La/1.0 | 0.1 | 6.0 | 0.1 | 48.0 | 3680 | +9.5 | 24400 |
| 34 | | | | | 0.4 | 45.3 | 3915 | +5.8 | 28000 |
| 35 | | | | | 0.8 | 45.9 | 3835 | +9.7 | 28900 |

TABLE 4

| No. | X | Ln | a/b | c/d | Na$_2$O | Ta$_2$O$_5$ | MnO$_2$ | $\epsilon_r$ | Qu(at 4 GHz) | $\tau_f$ | Resonator Qu |
|---|---|---|---|---|---|---|---|---|---|---|---|
| 36 | 0.59 | La/1.0 | 0.85 | 1.1 | 0.1 | 1.0 | — | 41.7 | 4200 | −11.2 | 35000 |
| 37 | 0.77 | | 1.15 | 0.96 | | | 0.1 | 48.5 | 3950 | +30 | 30000 |
| 38 | 0.68 | | 1.14 | 1.12 | | | | 47.2 | 3880 | +29.2 | 31200 |
| 39 | | | 1.16 | 0.99 | | 0.5 | | 42.6 | 3990 | +2.1 | 32100 |
| 40 | | | 0.88 | 1.05 | | | | 44.8 | 3880 | +4.1 | 31100 |
| 41* | | | 0.6 | 1.05 | | | | 46.2 | 2880 | +6.1 | 24000 |
| 42* | | | 1.5 | 1.05 | | | | S.F. | — | — | — |
| 43* | | | 0.99 | 0.7 | | | | S.F. | — | — | — |
| 44* | | | 0.6 | 1.28 | | | | 40.2 | 3000 | −12.2 | 28000 |

S.F.: Sintering failure (3) Evaluation of Dielectric Characteristics

Each of the test pieces produced in (1) and (2) was subjected to measurement of $\epsilon_r$, Qu, and $\tau_f$ (temperature range: 25 to 80° C.) at a resonance frequency of 3 to 5 GHz by means of the parallel-conductive-plate-type dielectric rod resonator method (TEO$_{011}$ MODE) or a similar technique. In this case, $\tau_f$ was calculated by use of the following formula: $\tau_f=(f_{80}-f_{25})/(f_{25}\times\Delta T)(\Delta T=80-25=55°$ C.). The results of $\epsilon_r$, Qu, and $\tau_f$ are shown in Tables 2 through 4.

As shown in FIG. 1, the dielectric resonator produced in (1) was fixed onto an alumina-made supporter joined to the inner bottom of a metallic casing, and Qu of the resonator was measured by means of TE$_{01\delta}$MODE. In FIG. 1, reference numeral 1 denotes the dielectric resonator, 2 the alumina-made supporter, and 3 the metallic casing. The results of Qu measurement are shown in Tables 2 through 4. In Tables 2 through 4, Test Examples marked with * fall outside the scope of the present invention.

(4) Effects Confirmed in the Second Embodiment

As is clear from the results shown in Table 2, in Test Examples 1 and 3 through 5 in which different Ln species are employed (one Ln species for each Test Example), the dielectric ceramic compositions exhibit practically sufficient $\epsilon_r$, Qu, and $\tau_f$, and the resonators exhibit high Qu. The dielectric ceramic composition of each of Test Examples 8 through 16, in which merely La is employed as Ln and Ta$_2$O$_5$ is incorporated, exhibits very high $\epsilon_r$ and Qu. The results also show that the dielectric ceramic composition of Test Example 9, 12, or 15 containing Na$_2$O exhibits excellent $\epsilon_r$ and $\tau_f$ as compared with that of Test Example 10, 13, or 16 containing no Na$_2$O, and the resonator of Test Example 9, 12, or 15 exhibits considerably increased Qu. The results of Test Examples 8, 9, 11, and 12 show that, when the value of x is small, the resonator exhibits a Qu of more than 35,000.

The dielectric ceramic composition of Test Example 2 in which Y is employed as Ln and Na$_2$O is not incorporated, or the dielectric ceramic composition of Test Example 6 in which Yb is employed as Ln and Na$_2$O is not incorporated exhibits sufficient $\epsilon_r$ and $\tau_f$ as compared with that of Test Example 1 or 5 containing Na$_2$O, but the resonator of Test Example 2 or 6 exhibits considerably lowered Qu. The dielectric ceramic composition of Test Example 7 in which x is below the lower limit exhibits sufficient Qu, but considerably lowered $\epsilon_r$, and $\tau_f$ of a very large negative value.

As is clear from the results shown in Table 3, the dielectric ceramic composition of Test Example 17 or 18 containing Ta$_2$O$_5$ and MnO$_2$ exhibits practically sufficient $\epsilon_r$ and Qu. In contrast, the dielectric ceramic composition of Test Example 19 or 20 in which x exceeds the upper limit exhibits sufficient $\epsilon_r$, but $\tau_f$ of a very large positive value. In addition, the resonator of Test Example 19 or 20 exhibits considerably lowered Qu.

The results also show that, in Test Examples 21 through 25 in which at least two Ln species including La are employed and the amount of Na$_2$O is varied, and in Test Examples 27 through 29 in which the amounts of Na$_2$O and MnO$_2$ are varied, the dielectric ceramic compositions exhibit excellent $\epsilon_r$, Qu, and $\tau_f$—although these values vary in accordance with compositional proportions, and the resonators exhibit sufficiently high Qu. The results also show that, in Test Examples 21 through 25 and 27 through 28 in which the amount of Na$_2$O falls within a preferred range, the dielectric ceramic compositions exhibit excellent $\tau_f$ and high $\epsilon_r$, and the resonators exhibit high Qu, as compared with the case of Test Example 26 in which the amount of Na$_2$O exceeds the preferred upper limit.

In Test Examples 30 through 32 in which merely La is employed as Ln and the amount of Ta$_2$O$_5$ is varied, the dielectric ceramic compositions exhibit practically sufficient dielectric characteristics. In contrast, in Test Examples 33 through 35 in which merely La is employed as Ln, the amount of MnO$_2$ is varied, and the amount of Ta$_2$O$_5$ exceeds the upper limit, the dielectric ceramic compositions exhibit sufficient $\epsilon_r$ and $\tau_f$, but the resonators exhibit considerably lowered Qu. In Test Example 35 in which the amount of MnO$_2$ also exceeds the upper limit, the resonator exhibits further lowered Qu.

As is clear from the results shown in Table 4, in Test Example 41 in which the ratio of Ca/Ti (a/b) is as low as 0.6 in the sintered product, or in Test Example 44 in which the ratio of Ca/Ti (a/b) is as low as 0.6 and the ratio of Ln/Al (c/d) is as high as 1.28 in the sintered product, the dielectric ceramic composition exhibits a Qu of 3,000 or less, and the resonator exhibits a lowered Qu (28,000 or less). In Test Example 42 in which the ratio of Ca/Ti (a/b) is as high as 1.5 in the sintered product, or in Test Example 43 in which the ratio of Ln/Al (c/d) is as low as 0.7 in the sintered product, sintering failure results. In contrast, in Test Examples 36 through 40 in which the ratio of Ca/Ti (a/b) and the ratio of Ln/Al (c/d) in the sintered products fall within a range of 0.8 to 1.2, the dielectric ceramic compositions exhibit an $\epsilon_r$ of at least 41 and a Qu of at least 3,800, and the resonators exhibit a Qu of at least 30,000; i.e., the compositions and resonators exhibit practically sufficient dielectric characteristics. Particularly in Test Examples 39 and 40 in which the ratio of Ca/Ti (a/b) and the ratio of Ln/Al (c/d) in the sintered products fall within ranges of 0.88 to 1.16 and 0.99 to 1.05, respectively, as compared with the cases of Test Examples 36 through 38, the dielectric ceramic compositions exhibit a considerably small absolute value of $\tau_f$ and high $\epsilon_r$ and Qu, and the resonators exhibit high Qu; i.e., the compositions and resonators exhibit further excellent dielectric characteristics.

The present invention is not limited to the aforementioned specific embodiments, and in accordance with the purpose and use of the invention, various modifications may be performed within the scope of the present invention. For example, powdery raw materials to be employed may be powders of oxides such as titanium oxide, calcium oxide, lanthanum oxide, neodymium oxide, samarium oxide, aluminum oxide, tantalum oxide, and manganese oxide; or compounds (e.g., carbonates) of these metallic elements that generate, through firing, $TiO_2$, $CaO$, $La_2O_3$, $Nd_2O_3$, $Sm_2O_3$, $Al_2O_3$, $Ta_2O_3$, and $MnO_2$. Raw materials for Ca and Na components may be $CaCO_3$ and $Na_2CO_3$; or other types of compounds of Ca and Na, such as peroxides, hydroxides, and nitrates. Similar to the case of Ca and Na components, raw materials for the other elemental components may be various compounds that can be converted into oxides through heating.

INDUSTRIAL APPLICABILITY

The present invention provides a dielectric ceramic composition which has a $CaTiO_3$-$REAlO_3$-based crystal structure, which exhibits practically sufficient $\in_r$, and which permits variation of Qu and $\tau_f$ within wide ranges. According to the present invention, Qu and $\tau_f$ can be regulated appropriately. The present invention also provides a dielectric ceramic composition having a $CaTiO_3$-based crystal structure and exhibiting practically sufficient dielectric characteristics. According to the present invention, when the compositional proportions of the dielectric ceramic composition are specified, $\in_r$ and Qu can be further increased, and the absolute value of $\tau_f$ can be decreased. Since the entirety of the dielectric ceramic composition (including the interior thereof) can be sintered sufficiently, even when a large-sized dielectric resonator product is produced from the composition, the resonator exhibits high Qu.

What is claimed is:

1. A microwave dielectric ceramic composition comprising
   A.) a primary component represented by the compositional formula: $xCa_aTi_bO_3$-$(1-x)Ln_cAl_dO_3$, wherein $0.54 \leq x \leq 0.82$; wherein Ln is at least one species selected from among Y, La, Ce, Pr, Nd, Sm, Eu, Gd, Dy, Er, and Yb; and wherein each of a/b and c/d ranges from 0.8 to 1.2 and
   B.) Na in an amount as reduced to $Na_2O$ of 0.02 to 0.5 parts by mass on the basis of 100 parts by mass of the primary component.

2. The microwave dielectric ceramic composition of claim 1, wherein La accounts for at least a portion of Ln.

3. The microwave dielectric ceramic composition of claim 1 or 2, further comprising Ta in an amount as reduced to $Ta_2O_5$ of 0.3 to 5 parts by mass on the basis of 100 parts by mass of the primary component.

4. The microwave dielectric ceramic composition of claim 3, further comprising Mn in an amount as reduced to $MnO_2$ of 0.5 parts by mass or less on the basis of 100 parts by mass of the primary component.

5. The microwave dielectric ceramic composition of claim 1, which exhibits an unloaded Q of at least 30,000 at a resonance frequency of 800 MHz.

6. The microwave dielectric ceramic composition of claim 5, which exhibits a temperature coefficient of resonance frequency of −10 to +10 ppm/° C.

7. A microwave dielectric ceramic composition produced by
   A.) mixing together
      i.) a Ca-containing oxide and/or a Ca-containing compound which can be converted into an oxide of Ca through heating;
      ii.) a Ti-containing oxide and/or a Ti-containing compound which can be converted into an oxide of Ti through heating;
      iii.) an Ln-element-containing oxide and/or an Ln-element-containing compound which can be converted into an oxide of Ln through heating, wherein Ln is at least one species selected from among Y, La, Ce, Pr, Nd, Sm, Eu, Gd, Dy, Er, and;
      iv.) an Al-containing oxide and/or an Al-containing compound which can be converted into an oxide of Al through heating; and
      v.) an Na-containing oxide and/or an Na-containing compound which can be converted into an oxide of Na through heating, the oxides and/or the compounds serving as raw materials,
   wherein the relative proportions by mol of Ca, Ti, the Ln element, and Al are x:x:(1-x):(1-x); wherein $0.54 \leq x \leq 82$; and
   wherein the amount as reduced to $Na_2O$ of the Na-containing oxide and/or the Na-containing compound which can be converted into an oxide of Na through heating is 0.02 to 0.5 parts by mass on the basis of 100 parts by mass of the total amount of the Ca-containing oxide and/or the compound which can be converted into an oxide of Ca through heating, the Ti-containing oxide and/or the Ti-containing compound which can be converted into an oxide of Ti through heating, the Ln-element-containing oxide and/or the Ln-containing compound which can be converted into an oxide of Ln through heating, and the Al-containing oxide and/or the Al-containing compound which can be converted into an oxide of Al through heating,
   to provide a raw material mixture; and
   B.) firing the raw material mixture to provide the microwave dielectric ceramic composition.

8. A dielectric resonator produced from a microwave dielectric ceramic composition comprising
   A.) a primary component represented by the compositional formula: $xCa_aTi_bO_3$-$(1-x) Ln_cAl_dO_3$, wherein $0.54 \leq x \leq 0.82$; wherein Ln is at least one species selected from among Y, La, Ce, Pr, Nd, Sm, Eu, Gd, Dy, Er, and Yb; and wherein each of a/b and c/d is 0.8 to 1.2 and
   B.) Na in an amount as reduced to $Na_2O$ of 0.02 to 0.5 parts by mass on the basis of 100 parts by mass of the primary component.

9. The dielectric resonator of claim 8, which exhibits an unloaded quality factor of at least 30,000 at a resonance frequency of 800 MHz.

* * * * *